Oct. 24, 1944.　　　　A. F. OATLEY　　　　2,361,317

BURNER AND HOT PLATE FOR GAS FIRED COOKING APPARATUS

Filed Aug. 21, 1941

INVENTOR

ARTHUR FREDERICK OATLEY

*Samuel Scrivener Jr.*

ATTORNEY

Patented Oct. 24, 1944

2,361,317

UNITED STATES PATENT OFFICE 2,361,317

BURNER AND HOT PLATE FOR GAS-FIRED COOKING APPARATUS

Arthur Frederick Oatley, Deepfields, England

Application August 21, 1941, Serial No. 407,812
In Great Britain September 2, 1940

7 Claims. (Cl. 126—215)

The invention relates to burners and tops of gas fired cooking apparatus. Frequently in such tops there is merely a frame or grid of removable bars for supporting utensils over the burners during heating, or at the side of the burners until the contents are required for use.

The burners in the tops of ordinary domestic gas heated cookers are usually completely open above the burner which is situated just below the top plate or built up frame, but the vessel-supporting frame bars are often cast integral with ring-like supports having short radial arms projecting into the open space above the burner.

It has however been proposed to use a solid deflector plate above the burner with a chamber beneath it to which gas, or a combustible mixture of gas and air, is supplied and is burnt at the top of the chamber as it emerges around the peripheral edge of the deflector plate; but the deflector plate is really in the nature of a part of the gas burner head.

In the present invention such a burner arrangement comprises a gas burner, preferably a non-aerated burner, at or near the bottom of a side wall which encloses the space in which the flames rise from the burner and thus forms a combustion chamber at the top of which is a solid plate directly over the burner, but spaced at its edge from the top of the wall and forming a heating plate, since it receives the vessel and conducts the heat from the combustion chamber directly to it.

This side wall of the combustion chamber constitutes the sole support of the heating plate which is itself isolated as far as possible from the cooker top by being supported therein on a peripherally extending lip connected to the side wall by means of a series of ribs whereby the combustion chamber is supported in the cooker top in a manner giving only the minimum metallic path for the conduction of heat to the latter.

It is preferred that the heating plate shall be provided with depending webs which pass into the space enclosed by the surrounding wall, and that the wall shall provide a seating on which the webs will rest to support the heating plate with its periphery spaced away from the surrounding wall and thus providing the escape passage for the products of combustion from the said enclosed space.

The surrounding wall, enclosing the space around the flames arising from the burner, may conveniently be supported in its turn on spaced seatings on the remainder of the top plate or frame of the cooking apparatus.

A preferred embodiment of the invention includes a surrounding wall which is of a cross-section that provides a step or open channel below its upper edge, which, when the parts are assembled in place in the cooking apparatus, will lie below the periphery of the heating plate in order that the upper part of the surrounding wall shall collect any liquids which may boil or spill over from a vessel or utensil on the heating plate and discharge them outside the enclosed space of the burner.

It is preferred that the depending webs from the heating plate shall divide the space in the combustion chamber above the burner into compartments corresponding in number to the nozzles of the burner; but with provision in the webs for gas communication between the compartments in order to facilitate simultaneous ignition of the gas in all compartments from a single source. For example the webs may terminate short of the burner nozzles.

The drawing is appended hereunto in order that the nature of the invention and a convenient manner of carrying it into practice shall be more readily ascertained.

Figure 1:
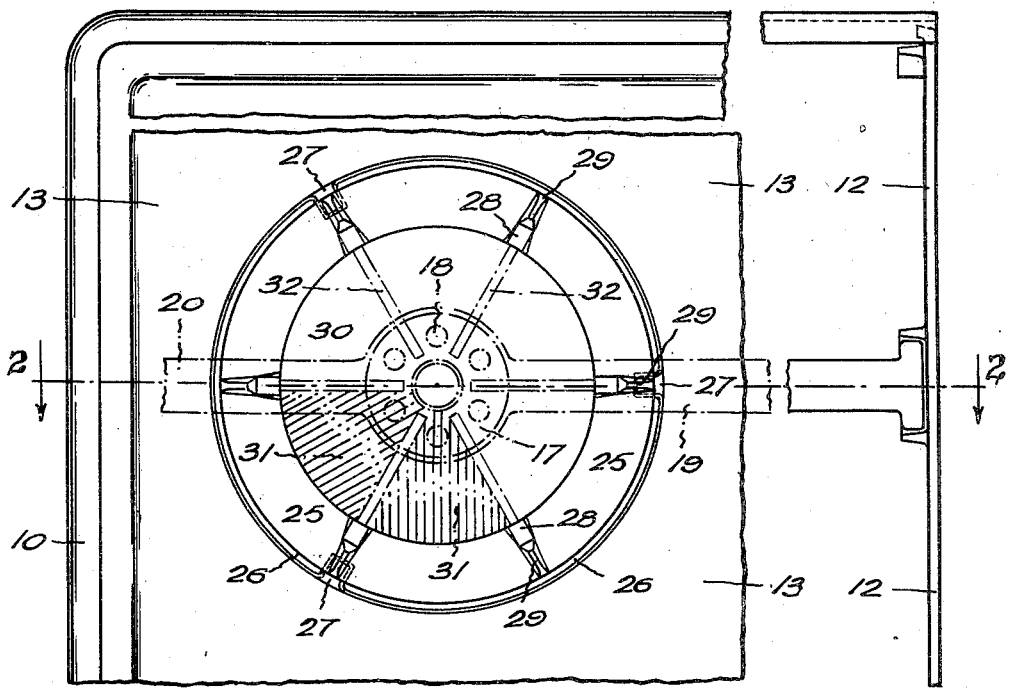
Figure 1 is a plan of a portion of a cooker top with a gas burner arranged in accordance with this invention.

In the illustrated arrangement it will be understood that the drawing illustrates a fragment taken from the upper part of a gas fired cooking apparatus usually known as a cooker. Where more than one burner is provided in the cooker top which is the most usual arrangement each burner will be constructed as in this illustrated arrangement.

In the drawing the part 10 comprises the cooker front frame members and the part 12 the back plate or frame. 13 is a top plate which except for the openings around the burner or burners may be a smooth continuous sheet with an enameled finish; but on the other hand if a removable bar construction of the hot plate is preferred such construction may be used. 14 is the top plate of the usual oven and is above any insulating packing with which the latter may be provided. Behind the part 10 at the front of the upper part of the cooker may be arranged a gas supply pipe 15 with which connections are made to the various burners through control cocks 16. 17 is a ring burner provided with a number of nozzles or jets 18 which may be simple fan flame jets or multiple pencil flame jets. Beyond the ring burner is a support bar 19 which may extend to the back wall or to any support bracket carried thereby or by the top plate. The gas inlet pipe 20 of this burner runs at full bore from a support connection at 21 on the delivery side of the cock 16. Above this burner, and surrounding the flames which will rise from the burner jets, is an upstanding wall 22 here shown of circular horizontal section to suit the circular plan of the burner head. The upper part of this wall 22 inclines outwardly as at 23 and finishes in a step or open channel section part 24 with a still further outwardly inclined lip at 25 which preferably terminates in the plane of the top plate 13 of the cooker top, but is spaced clearly therefrom as shown at 26, so that no heat conduction from the wall to the hot plate can take place.

The wall 22 is supported in spaced relationship to the burner head 17 and to the top plate 13 in this example by three separated cast lugs 27 on which three gaps in the lower part of the outer edge of the lip 25 locate the wall. There are only three small points of contact between the combustion chamber wall and the top plate 13.

A rib 28 extends across the open channel section part 24 at say six points around the chamber and finishes in a ramp 29.

The top of the combustion chamber formed by the wall 22 surrounding the flames rising from the burner head 17 is mainly closed by a solid heating plate 30 which supports the utensil or vessel over the burner. The underside of the plate is provided with a number of outwardly directed corrugations 31 to increase the surface area in contact with the hot gases in the combustion chamber without impeding the outward flow of the products of combustion. Further depending from this underside of the heating plate 30 are six vertical webs 32 of such a depth that they pass well down into the space enclosed by the surrounding wall into the proximity of the burner jets 18. The outermost edges of these webs 32 are shaped approximately to the inclination of the part 23 of the wall 22, but are provided with a shoulder 33 to rest over the edge of the step or channel part 24 of the wall 22. The contact of this heating plate with the surrounding wall whilst being adequate to support the load of any utensil likely to be used upon it is kept as small as possible in area. In this example the number of vertical webs 32 corresponds with the number of burner jets 18, thus dividing the space or combustion chamber above the burner enclosed by the surrounding wall into compartments. The inner edges of the webs 32 stop short of the centre of the chamber, however, in order that there shall be intercommunication for the gas for ignition purposes. The heating plate 30 roofs over the chamber enclosed by the surrounding wall and practically complete combustion of the gas which burns at the jets takes place within the chamber, so that the hot plate is efficiently heated, and as the products of combustion pass along its under side to escape around its peripheral edge in the space 34 between it and the edge of the lip 25 of the wall they yield up a great part of their heat to the plate which is further heated by conduction from the webs 32 that depend into the combustion chamber.

Figure 2:
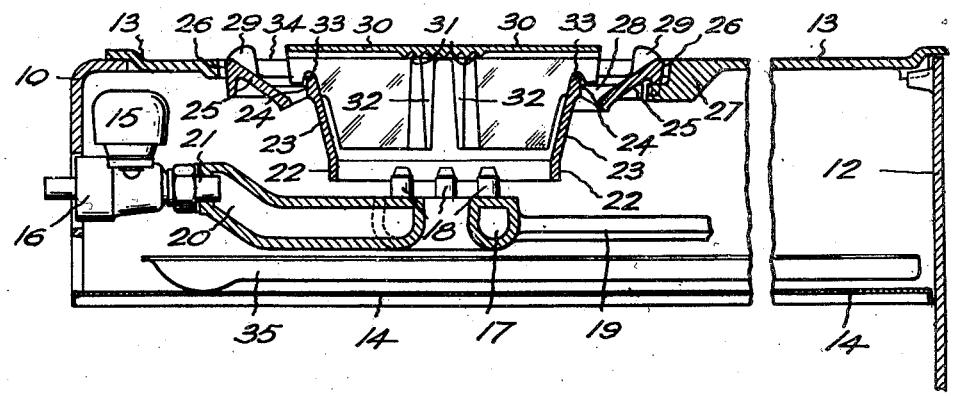
Figure 2 is a vertical sectional view taken through the line 2—2 of Figure 1.

It will be seen, more especially from the sectional elevation at Figure 2, that the edge of the heating plate 30 terminates above the step or open channel part 24 of the wall 22 and within the edge of the lip 25 of the wall, so that any contents of utensils resting on the plate which may spill over are collected by this lip of the wall and are delivered outside the part 23 of the surrounding wall and cannot fall upon the burner jets 18. The top plate 14 of the oven is provided with the usual removable spillover tray which is here marked 35, in which any drippings from the spillover channel are collected.

It will be obvious from the illustrated example that if desired the vertical sided lower portion of the surrounding wall could be made of greater depth so as to enclose the burner ring 17 or the greater part of the burner also, one side of the wall being gapped or slotted at the bottom to pass over the burner inlet pipe 20.

The burner and hot plate arrangement in accordance with the invention is found to possess considerable advantages in economy in gas consumption and in effective heating of the heating plate 30 on which the vessel or utensil will rest, since the enclosure of the combustion chamber or flame chamber above the burner protects the flames from draughts and makes for steady and smooth working of the burners. The inclined portion 23 of the surrounding wall tends to reflect back any heat which it takes up from the burner flames on to the webs 32 or the under side of the heating plate 30 and assists in promoting the efficiency of the arrangement. A further advantage of the illustrated construction is that the parts may be removed for cleaning and like purposes without difficulty.

It is found that the size of the heating plate relatively to the vessel is important. With small vessels having a diameter of say five inches or less, the problem of condensation from the products and air around the cool sides of the vessel in the early stage does not arise; but with larger vessels this becomes noticeable if the heating plate extends to, or near to, the edge of the bottom of the vessel. The water of condensation will run down the vessel and along its under side to evaporate suddenly on the plate and give rise to small explosive sounds which is objectionable.

If the plate is limited in size to five and a half inches sufficient space at the bottom of the vessel is left for the products to impinge directly on the vessel and drive the condensation off and evaporate it without the possibility of it reaching the highly heated plate 30.

It may be that in commercial cooking apparatus where very large vessels may be used that larger plates could be used with success; but for domestic apparatus the size of 5½" or slightly less is believed to be the most satisfactory arrangement.

I claim:

1. A combustion chamber and heating plate assembly for gas fired cooking apparatus having a top plate with an opening therein and a burner positioned within the opening and below the level of the plate, comprising an annular substantially vertical wall adapted to surround the burner, a heating plate, means supporting said heating plate on said wall in spaced relation thereto, and an annular lip connected to said wall in spaced surrounding relation thereto and adapted to be supported on the top plate within the opening therein.

2. A combustion chamber and heating plate assembly according to claim 1, in which the means for connecting the lip to the wall comprise an annular series of spaced ribs, each of said ribs being connected at one end to the lip and at the other end to the outer surface of the wall adjacent the upper end thereof.

3. A combustion chamber and heating plate assembly according to claim 1, in which the lip is upwardly and outwardly inclined in order to form around the side wall and below the edge of the heating plate means for draining between the connecting ribs.

4. A combustion chamber and heating plate assembly according to claim 1, in which the means for supporting the heating plate on the side wall comprise spaced vertical webs connected to the plate and extending downwardly therefrom and adapted to rest on the upper edge of the side wall.

5. A combustion chamber and heating plate assembly according to claim 1, in which the means for supporting the heating plate on the side wall comprise spaced vertical webs connected to the plate and extending downwardly therefrom and adapted to rest on the upper edge of the side wall and having parts extending into the space within the side wall and above the burner.

6. A combustion chamber and heating plate assembly according to claim 1, comprising in addition a plurality of downward-extending webs connected to the lower side of the heating plate, and a plurality of downwardly-extending corrugations formed on the lower side of the heating plate.

7. A gas fired cooking apparatus comprising a top plate having an opening therein, a burner positioned within the opening below the level of the plate, an annular vertical wall surrounding the burner and positioned within the opening, a heating plate supported on said wall in spaced relation thereto, an annular lip connected to said wall in spaced surrounding relation thereto, and means supporting said lip in spaced relation to said top plate within the opening therein.

ARTHUR FREDERICK OATLEY.